July 14, 1942.  A. D. GRANVILLE  2,290,042
COMBINATION FEED CARRIER AND FEEDER
Filed Nov. 1, 1941  2 Sheets-Sheet 2
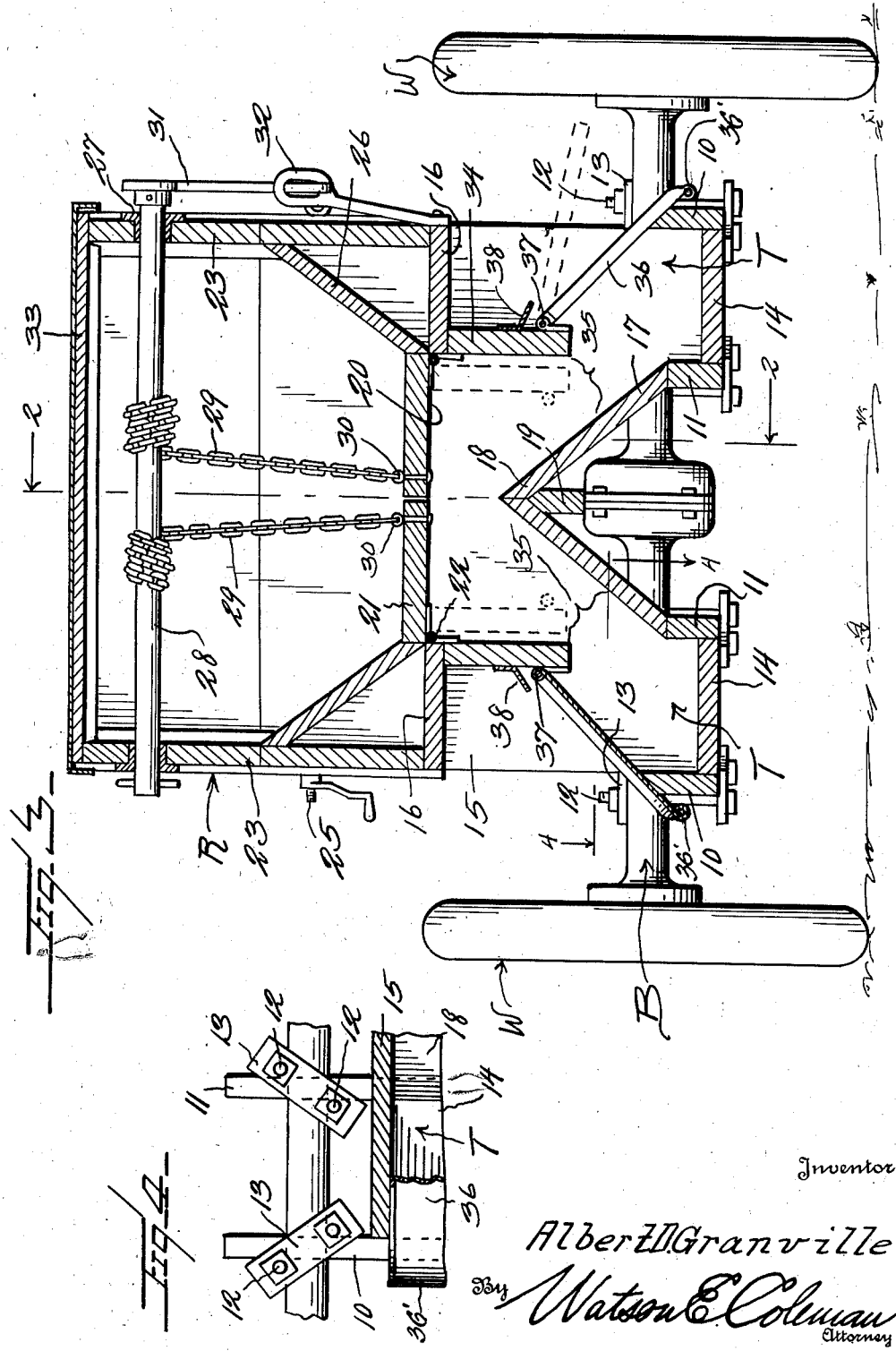
Inventor
Albert D. Granville
By Watson E. Coleman
Attorney Patented July 14, 1942

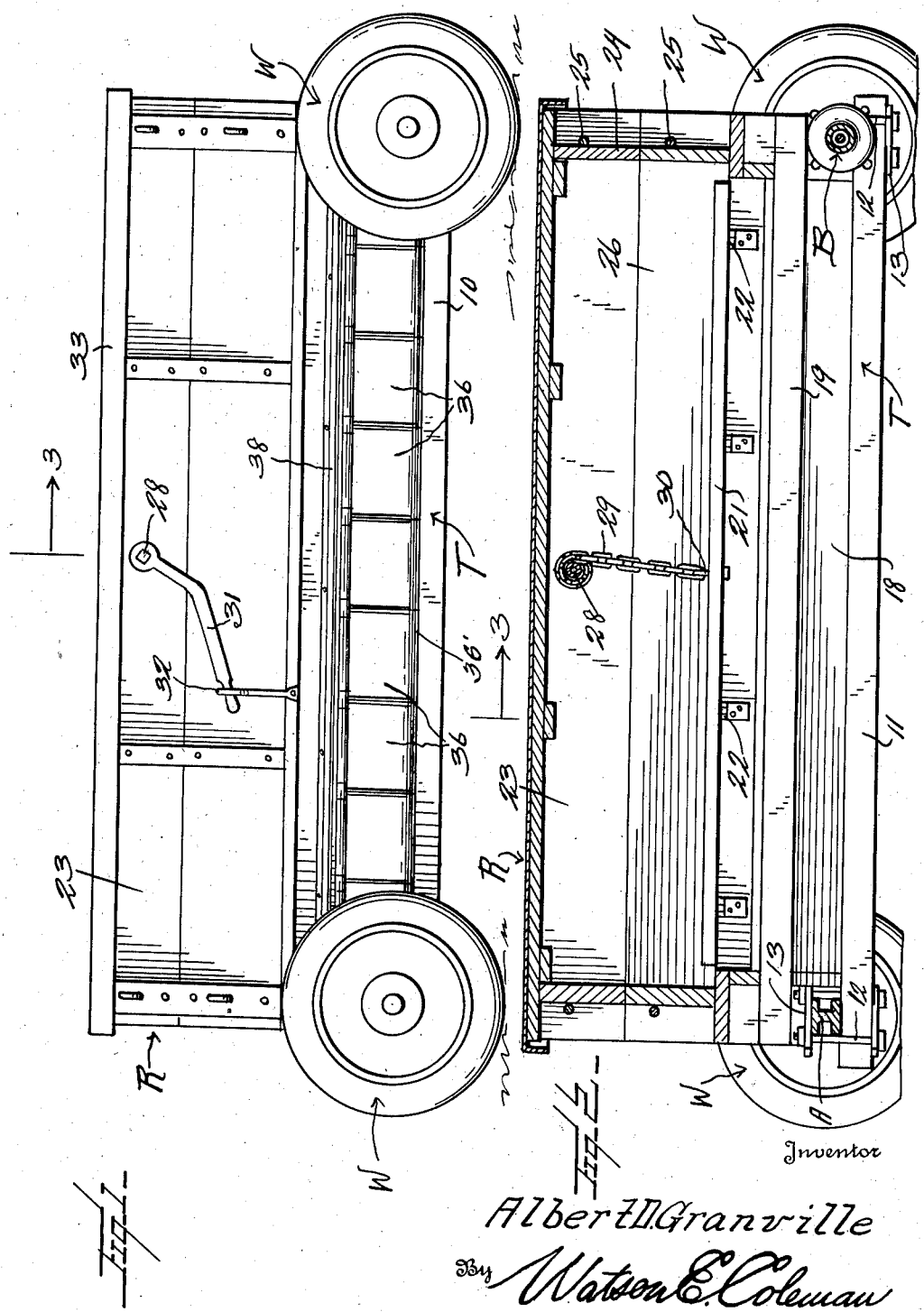

2,290,042

UNITED STATES PATENT OFFICE 2,290,042

COMBINATION FEED CARRIER AND FEEDER

Albert David Granville, Stanhope, Iowa

Application November 1, 1941, Serial No. 417,537

1 Claim. (Cl. 119—52)

This invention relates generally to improvements in material transporting devices and pertains particularly to a movable wheeled structure for transporting animal feed.

The primary object of the present invention is to provide a combination carrier receptacle and feeder by means of which feed, particularly hog feed, may be readily transported to a desired location and dumped into feeders which form a part of the transportation structure so that the animals may be supplied with feed in a manner which prevents the feed from becoming dirty but enables the animals to have ready access thereto whenever they desire.

Another object of the invention is to provide an animal feed carrier and feeder structure comprising a receptacle having a dump bottom and feeding troughs mounted beneath the receptacle with means to receive the feed material from the receptacle when the dump bottom is opened, the entire structure being supported upon wheels so that it may be readily moved from place to place.

Still another object of the invention is to provide a combination structure of the character above set forth wherein the feed troughs are covered by a plurality of doors arranged in side by side relation and designed so that the hogs may readily open the same to gain access to the inside of the trough and the feed therein.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings:

Fig. 1 is a view in side elevation of the structure embodying the present invention.

Fig. 2 is a longitudinal section taken substantially on the line 2—2 of Fig. 3.

Fig. 3 is a transverse section taken substantially on the line 3—3 of Fig. 1.

Fig. 4 is a detailed section taken substantially on the line 4—4 of Fig. 3.

Referring now more particularly to the drawings it will be seen that the present structure is shown mounted upon supporting wheels which are four in number and are indicated by the character W. These wheels are connected with front and rear axles A and B respectively for the support of the structure about to be described.

Any suitable type of axle structure might be employed but there are here shown the front and rear axle structures of a discarded motor vehicle and wheels connected with such axles are of the pneumatic type used on the motor vehicle.

In accordance with the present invention there is provided upon each side of the longitudinal center of the structure an animal feed trough which is indicated generally by the character T and each trough comprises a pair of spaced parallel inner and outer beams 10 and 11 respectively. These beams as shown extend at their ends beneath the front and rear axles and are tied to the axles by pairs of bolts 12 which at their upper and lower ends pass through and are secured to the yoke plates 13 one of which lies across the top of the axle and the other across the under side of the adjacent beam, the bolts 12 being disposed upon opposite sides of the axle as is shown in Fig. 4.

Secured between each pair of beams 10 and 11 is a floor board 14 which extends the full length of the trough. At each end of the structure there is a vertical wall 15 which extends from the outer beam 10 of one trough across to the outer beam 10 of the other trough and as is clearly shown in Fig. 3 such end walls extend upwardly a substantial distance above the troughs and are connected to the under side or bottom 16 of and support the feed receptacle which is indicated as a whole by the reference character R.

Each end wall 15 has its lower edge cut out in the form of an inverted V, as indicated at 17, and there extends upwardly and inwardly from the top of the inner beam 11 of each trough, an inclined wall 18. These walls follow the edges of the V cut-out in the end walls and come together or converge on the longitudinal center of the structure, as shown in Fig. 3.

For reinforcing the structure a central or hip beam 19 is run along within the angle formed between the walls 18 as shown in Fig. 3, and is supported at each end upon the axle adjacent thereto as shown.

The bottom 16 of the receptacle R has a discharge opening 20 formed therein and extending lengthwise of this opening are the two drop doors 21 of each of which is hinged as indicated at 22, at its outer edge, to the adjacent edge of the floor to swing downwardly through the opening 20.

The numeral 23 indicates the side walls for the receptacle which rest upon the floor 16 at the outer edges thereof and at each end of the receptacle there is provided a removable gate 24 which is held in place in any suitable manner as, for example, by the use of the transverse rods 25 which are extended through the side walls upon the outer sides of the end gates.

Within the receptacle there are disposed the inclined false bottoms 26 which slope downwardly from the side walls to the edges of the opening 20 and have the outer edges of the gates 21 abutting thereagainst as shown in Fig. 3. These false bottoms serve to guide the feed to the opening 20 when the gates are dropped as will be readily understood.

Supported in suitable bearings 27 which are mounted in the side walls 23 of the receptacle, is a transverse shaft 28 to which are attached two chains 29 which are adapted to be wound up thereon. These chains are connected to the gates 21 adjacent the free longitudinal edges thereof as indicated at 30 so that by winding up the chains the gates will be raised to a horizontal position to close the opening 20. Upon one end of the shaft 28, outside of the receptacle, there is attached a lever or crank arm 31 which facilitates the turning of the shaft and suitable means in the form of a yoke 32 attached to the adjacent outer side of the receptacle, is provided to hold the crank arm against movement when desired, as shown in Fig. 1.

For the protection of the contents of the receptacle a removable cover 33 is provided which completely closes the top of the receptacle as shown.

At each side of the opening 20 there is secured to the floor 16 the longitudinal depending wall 34 which is located above the inner side of the adjacent trough and spaced above the lower edge of the adjacent inclined wall 18. These walls combine to form a guide for material discharged through the opening 20 and each wall 34 co-acts with an inclined wall 18 to form a throat 35 through which feed material passes into the adjacent trough.

Upon the outer side of each hanging wall 34 there is secured a series of gravity actuated doors 36, the pivots for which are indicated by the numeral 37. These doors lie in close side by side relation and each extends outwardly and downwardly across the outer beam 10 of the adjacent trough, as shown in Fig. 3, thus providing an overhanging portion sufficient to enable the hog to lift a door with his snout to gain access to the trough. These doors function to prevent the entrance of rain or dirt into the trough and in order to further avoid this there is provided a deflector flange 38 which extends lengthwise of the outer side of each depending or hanging wall 34 above the hinges of the gravity doors to prevent rain from running down the walls 34 and into the trough.

In the illustration of the present invention there has not been shown any means for moving the same. This structure is designed to be used as a trailer behind a wagon or tractor, therefore, any suitable hitch means may be employed for coupling the trailer to the draft vehicle.

The lower edges of the doors 36 are turned or rolled as indicated at 36' so that the animals may be able to lift the doors by engaging their snouts thereunder. Because of the rounding of the edges this may be done without danger of the animals injuring themselves.

From the foregoing it will be readily seen that the structure herein described provides a convenient means for transporting the feed grain to a mill for grinding and then back to the location where it is to be used and after reaching such location the ground grain can be readily discharged into the trough by dropping the gates 21 and the animals will be able to remove the feed from the troughs as desired without danger of the feed becoming dirty or contaminated.

What is claimed is:

An animal feed structure of the character described comprising supporting wheels and axles therefor, a pair of spaced troughs each including two spaced parallel longitudinal beams arranged at one side of the longitudinal center of the carrier and extending at their ends beneath the axles, means connecting the ends of the beams with the axles forming hangers for the beams, a centrally disposed longitudinally extending supporting beam arranged in a vertical plane midway between the inner beams of the troughs, said center beam being supported at its ends upon the axles, a longitudinally extending trough floor disposed between each pair of beams, a vertical end wall common to the ends of the troughs, a pair of upwardly converging walls each extending from an inner beam of a pair and terminating over and upon said central beam to be supported thereby, a vertical longitudinally extending wall above the inner side of each trough and secured at its ends between said end walls, said vertical walls each co-acting with an inclined wall to form a feed throat, a floor disposed horizontally and supported upon the top edges of the end walls and having a central opening lying between the vertical walls, downwardly swinging doors pivotally attached at their opposite edges to opposite sides of said floor opening to swing downwardly into parallel relation with the vertical walls, said doors being adapted to close the opening, means forming a receptacle above and supported upon said floor, and a plurality of doors hingedly secured to the outer side of each vertical wall and extending outwardly and downwardly therefrom over the adjacent trough to rest upon the outer one of the adjacent pair of beams.

ALBERT DAVID GRANVILLE.